United States Patent
Palanivel et al.

(10) Patent No.: US 9,521,296 B2
(45) Date of Patent: Dec. 13, 2016

(54) INVERSE HALFTONING USING INVERSE PROJECTION OF PREDICTED ERRORS FOR MULTI-BIT IMAGES

(71) Applicant: Xerox Corporation, Norwalk, CT (US)

(72) Inventors: Dhevendra A. Palanivel, Chennai (IN); Sunil Kumar, Chennai (IN); Sainarayanan Gopalakrishnan, Chennai (IN); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/469,944

(22) Filed: Aug. 27, 2014

(65) Prior Publication Data

US 2016/0065786 A1    Mar. 3, 2016

(51) Int. Cl.
*H04N 1/405* (2006.01)
*H04N 1/40* (2006.01)

(52) U.S. Cl.
CPC ........ *H04N 1/4052* (2013.01); *H04N 1/40075* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,506,699 A * | 4/1996 | Wong | H04N 1/40075 358/3.08 |
| 5,608,821 A | 3/1997 | Metcalfe et al. | |
| 5,696,601 A | 12/1997 | Metcalfe et al. | |
| 5,799,112 A * | 8/1998 | de Queiroz | H04N 1/40075 358/3.08 |
| 5,809,177 A | 9/1998 | Metcalfe et al. | |
| 5,880,857 A | 3/1999 | Shiau et al. | |
| 6,144,775 A | 11/2000 | Williams et al. | |
| 6,325,487 B1 | 12/2001 | Mantell | |
| 6,343,159 B1 * | 1/2002 | Cuciurean-Zapan | G06T 5/20 345/596 |
| 6,608,700 B1 | 8/2003 | Mantell | |
| 7,085,016 B2 | 8/2006 | Lu et al. | |

(Continued)

OTHER PUBLICATIONS

S.Hein et al., "Halftone to Continuous-Tone Conversion of Error-Diffused Coded Images", IEEE Trans. Image Process., vol. 4, No. 2, 1993, pp. 309-312.

(Continued)

*Primary Examiner* — Christopher D Wait
(74) *Attorney, Agent, or Firm* — Gibb & Riley, LLC

(57) ABSTRACT

In systems and methods, an original image was previously converted to a lower bit count per pixel. The resulting image included pixel error based on the lower bit count per pixel. The conversion used an error weighting matrix (which diffuses the pixel error of each pixel to adjacent pixels). Methods and systems produce an output image from the lower bit count per pixel image using the error weighting matrix to determine, for each pixel, the amount of error added because of the adjacent pixels during the conversion process. Then, such methods and systems remove, from each pixel, the amount of error that was previously added based on the adjacent pixels. After removing the amount of error added based on the adjacent pixels from all pixels in the input image, an output image is reconstructed using a filter, such as a low pass filter.

8 Claims, 6 Drawing Sheets

(56) References Cited

U.S. PATENT DOCUMENTS

| | | |
|---|---|---|
| 7,228,002 B2 | 6/2007 | Macy, Jr. |
| 7,495,805 B1 | 2/2009 | Au et al. |
| 7,719,722 B2 | 5/2010 | Sharma et al. |
| 7,869,095 B2 | 1/2011 | Mantell |
| 2012/0262475 A1* | 10/2012 | Frank .................... G09G 5/02 345/597 |

OTHER PUBLICATIONS

Ting, M. Y., "Error Diffused Image Compression Using a Binary-to-Gray-Scale Decoder and Predictive Pruned Tree-StructuredVector Quantization", IEEE Transactions on Image Processing, vol. 3, No. 6, 1994, pp. 854-858.

P.W.Wong, "Inverse Halftoning and Kernel Estimation for Error Diffusion", IEEE Trans. Image Process., vol. 4, No. 4, 1995, pp. 486-498.

R.L.Stevenson, "Inverse halftoning via map estimation", IEEE Trans. Image Process., vol. 6, No. 4,1997, pp. 574 -583.

Z.Xiong et al.,"Inverse halftoning using wavelets", in Proc. IEEE Int. Conf. on Image Processing, 1996, pp. 569-572.

M.Analoui et al.,"New results on reconstruction of continuous-tone from halftone", in Proc. IEEE Int. Conf. on Acoust. Speech Signal Processing, 1992, pp. 313-316.

N.T.Thao, "Set Theoretic Inverse Halftoning", in Proc. IEEE Int. Conf. on Image Processing, 1997, pp. 783-786.

V.Kolmogorov et al., "What energy function can be minimized via Graph Cuts?", IEEE Trans. Pattern Analysis and Machine Intelligence, 2004, pp. 147-159.

J.Yedidia et al., "Constructing Free-Energy Approximations and Generalized Belief Propagation Algorithms", IEEE Transactions on Information Theory, vol. 51, No. 7, Jul. 2005, pp. 2282-2312.

\* cited by examiner

INVERSE HALFTONING USING INVERSE PROJECTION OF PREDICTED ERRORS FOR MULTI-BIT IMAGES

CROSS-REFERENCE TO RELATED APPLICATIONS

This application is related to the following co-pending U.S. patent application Ser. No. 13/850,342, filed Mar. 26, 2013, issued as U.S. Pat. No. 9,215,345 assigned to the same Assignee: entitled "Method And System for Inverse Halftoning Utilizing Inverse Projection of Predicted Errors."

BACKGROUND

Systems and methods herein generally relate to image processing that use halftone techniques for multi-bit images.

In digital multifunction reprographic systems, a scanner accepts a document to be copied, scanned, or otherwise subsequently processed and converts the document into at least one electronic image. These images, usually in the form of pages, are then passed to a central control unit that may re-order or reorganize these pages and then, depending on the request of the user of the device, send the pages or images to a destination. Often this destination is an attached printing unit that makes one or more copies of the original document.

A multifunction digital device includes an image path that is the combination of software and hardware elements. The software and hardware elements accept the electronic images from a multiplicity of sources and perform a plurality of operations to convert the images to the format desired for the various output paths.

The image path for a multifunction device usually has several constraints. On one hand, there is a desire to make the image path utilize data in a multi-bit count per pixel format so as to provide for maximum image quality and a minimum loss of information in the transformation of documents from paper to electronic form. On the other hand, cost constraints and performance limits on the devices or software may compromise the image path.

In systems that convert gray scale image data to reduced bit size image data (so as to be processed by the image path) and back to gray scale image data for rendering, a halftone process can be utilized that uses error diffusion to convert gray scale image data to reduced bit image data. In this process, a pixel of gray scale image data is compared to a threshold values or threshold values and, depending upon the relationship of the value of the pixel of gray scale image data, a reduced bit size data value is generated.

For example, if the possible pixel value of the gray scale image data has a value between 0 and 255, the threshold value may be 128 such that a pixel value of the gray scale image data that is equal to or greater than 128 would generate a binary value of 1 (representing a gray scale value of 255) and a pixel value of the gray scale image data that is equal less than 128 would generate a binary value of 0 (representing a gray scale value of 0). In each instance, there would be a difference between the original a pixel value of the gray scale image data and the converted value. This difference is the error of the conversion process.

In a conversion process that utilizes error diffusion, the error is diffused (scattered or propagated) to neighboring pixels of the gray scale image data. More specifically, the error may be conventionally propagated to the next pixel in the scanline and to adjacent pixels in the next scanline. Moreover, in error diffusion processes, the error is weighted such that an adjacent pixel does not necessarily receive all the error, only a portion thereof.

With respect to converting the halftone image data to gray scale image data, low pass filtering and look-up table based approaches are some implementations of reconstructing gray scale image data from halftone image data. Examples of different conventional lowpass filters are halfband lowpass, Gaussian lowpass, and lowpass filtering based on singular value decomposition.

However, if the halftone image data is initially generated from gray scale image data using an error diffusion process, the error diffusion can inject noise into the gray scale image, primarily in the high frequency range. In other words, since an error diffusion process injects high frequency noise, a low pass filter cannot necessarily remove all of the noise purposefully introduced by the error diffusion process. Also, if a low pass filter is utilized to address the noise injected by the error diffusion process, there may be high frequency components in the original gray scale image, such that removal of noise by a low pass filter would also remove these desirable high frequency components of the original image data. Particularly a text region may lose sharpness due to the removal of the desirable high frequency components of the original image data.

In look-up table based approaches for reconstruction of gray image from error diffused halftone data, a small window is slid over the error diffused image data. The content of the halftone pixels in the window serves as an address to a look-up table. A gray level value is then retrieved as the constructed gray level of the center pixel in the window. The look-up table is constructed by a training algorithm using a collection of test images. The training of the conventional look-up table is time consuming. Moreover, since conventional error diffusion produces a halftone image in which the local average within any small area of the image approximates the gray level of the corresponding small area of the original gray scale image, very different bit patterns corresponding to the same local gray level can be obtained by simply shifting the halftoning window a small amount in any direction. The different bit patterns will result in different addressing to the look-up table during inverse halftoning. Also, very different halftone images from the same gray scale image can be generated by merely changing the initial condition in the error diffusion process.

Therefore, inverse halftoning is applied in wide variety of image processing problems, such as interchanging between halftone methods, scaling, tone correction, facsimile image processing, nonlinear filtering, enhancement, and image compression. In some scan to file applications, an error diffused image generated by image path hardware is stored in memory, then retrieved and converted to a contone (continuous tone) image. In the image path, the error diffused image is stored in memory and, when the printing device is ready for printing, the error diffused image is reconstructed into a continuous tone image in the backend processing and transferred to the printing device for printing. Storing the error diffused image helps save memory space.

As noted above, some processing uses low pass filtering based methods or look-up table methods for reconstructing continuous tone images from error diffused images. If the input is text or photo and text types, then the edge tag from a segmentation module is used to differentiate edge and non-edge regions. Low pass filtering may be applied only to non-edge regions to avoid distortion of edges and text. However, for a low computational system (e.g., those that use a software based image path) where segmentation is not affordable, tag based reconstruction methods are not economically viable.

SUMMARY

In view of the foregoing, the devices and methods herein reconvert an error diffused multi-bit image into a continuous tone image. Specifically, the devices and methods herein perform such action, based on an inverse projection of predicted errors, that performs reverse propagation of predicted errors to neighborhood pixels using an error diffusion filter kernel. Since these devices and methods perform reversal of the error propagation mechanism of the multi-bit error diffusion process, distortions introduced due to error diffusion process in a halftone image are suppressed in the reconstructed gray scale image, which allows the reconstructed image to have better peak signal to noise ratio (PSNR) and edge/text quality.

More specifically, exemplary methods herein receive an input image (e.g., halftone image) to be reconstructed into a higher bit count per pixel image. The input image that was received was previously created by converting an original image to a lower bit count per pixel, and has pixel error that results from the conversion to the lower bit count per pixel. The process of converting the original image diffused the pixel error of each pixel to adjacent pixels used an error weighting matrix.

The methods herein produce a reconstructed output image (e.g., gray scale or contone image) from the input image. This processing uses the error weighting matrix to determine, for each pixel in the input image, the amount of error that was previously added based on the error of adjacent pixels during the converting process. Then, this processing removes, for each pixel in the input image, the amount of error that was previously added based on the adjacent pixels in the original conversion.

For example, the pixels in the input image can be represented in a matrix, and the processes of determining the amount of error and removing the amount of error can be performed by processing each pixel individually (e.g., starting with a last matrix location at the end of the matrix and progressing back, pixel-by-pixel, to a first matrix location at the beginning of the matrix) using the error weighting matrix to determine and remove the error.

After removing the amount of error added based on the adjacent pixels from all pixels in the input image, the original image (or a close approximation thereof) is reconstructed from the input image using a filter, such as a low pass filter. The reconstruction process produces pixels having a higher bit count per pixel (e.g., 8 bit, etc.) relative to the lower bit count per pixel (e.g., 1 bit, 2 bit, etc.) of the input image. The reconstructed image is then output.

The process of reconstructing the image smoothes each pixel value using a filter, such as a low pass matrix filter. More specifically, this reconstruction process bases each pixel value, at least in part, on the adjacent pixels. In one example, this processing can use the low-pass matrix filter to multiply numerical values of the low-pass matrix filter by corresponding underlying pixel values of pixels adjacent a center pixel (the current pixel being processed over which the low-pass matrix filter is centered) to produce products, add these products together to produce a sum, and then multiply the sum by a reciprocal of the total of the low-pass matrix filter values to produce a resulting value of the center pixel. This is only one example, and those ordinarily skilled in the art would understand that other low pass filters could be used to reconstruct the contone image from the halftone image.

Image processing devices herein include, among other elements, an input, an image processor operatively (meaning directly or indirectly) connected to the input, a filter operatively connected to the image processor, and an output operatively connected to the image processor. The input receives a halftone image that was previously created by converting an original image into the halftone image to cause the halftone image to have a lower bit count per pixel relative to the original image. Also, the halftone image has pixel error as a result of (based on) the lower bit count per pixel. The process of converting diffuses (or propagates or spreads out) the pixel error of each pixel of the halftone image to adjacent pixels using an error weighting matrix.

The image processor produces a gray scale image from the halftone image, and the output outputs the gray scale image. More specifically, the image processor produces the gray scale image from the halftone image by determining (using the error weighting matrix) for each pixel in the halftone image, the amount of error added based on the adjacent pixels during the converting. Then, the image processor can remove (from each pixel in the halftone image) the amount of error added based on the adjacent pixels.

After completing the removal of the error added based on the adjacent pixels from all pixels in the halftone image, the image processor reconstructs the halftone image using a filter, such as the low pass matrix filter mentioned above. Thus, the image processor performs the reconstruction by basing each pixel value at least in part on the adjacent pixels, and the image processor performs the reconstruction by producing pixels having a higher bit count per pixel relative to the lower bit count per pixel of the halftone image.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figures 1, 2:
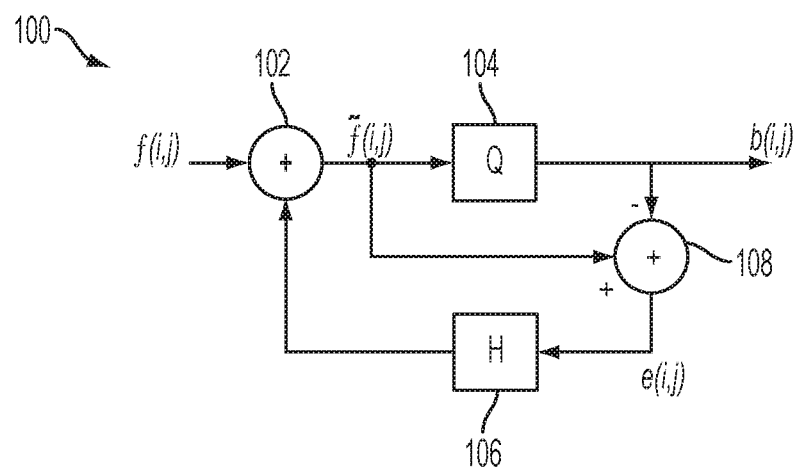
FIG. 1 is a schematic diagram illustrating circuit herein.
FIG. 2 is a schematic diagram illustrating filter herein.

As mentioned above, low pass filtering and look-up table based approaches are some ways of reconstructing gray scale images from halftone images. Different low pass filters can be used for reconstruction of gray scale images from halftone images (such as half-band low pass, Gaussian low pass, and low pass filtering based on singular value decomposition (SVD)). Further, the error diffusion process can be interpreted as one that injects noise into the gray scale image primarily at the high frequency range; and low pass filters cannot remove all of the noise purposefully introduced by the error diffusion process. Also, there may be high frequency components in the original gray scale image, so that removal of noise at the high frequency range will also remove these desirable high frequency components. In particular, text region may lose the sharpness.

The following devices and methods are described here using an example of converting a 2-bit error diffused halftone image back to contone, although those ordinarily skilled in the art would understand that any number bit (n-bit) error diffused image could be processed with the systems and methods herein, and 2-bit is used to simplify the discussion. In this example, a binary halftone image (where each pixel value is only a 0 or a 1) is distinguished from 2-bit error diffused image (where each pixel may have a value of 00, 01, 10, or 11) because the 2-bit pixel can represent pixel values between 0 and 1, representing values between fully on and fully off (e.g., the 2-bit pixel can have values such as 0 (fully off) or 0.25 (25% on) or 0.75 (75% on) or 1 (fully on), etc). Again, these are only examples, and the systems and methods herein are fully useful with devices and methods that use different bit numbers and different values for each bit.

Specifically, in this example, a gray scale image F=f(i, j) is an N×M two dimensional matrix of pixels (e.g., i, j, etc.) taking real intensities number in the range [0, 1] (1≤i≤N, 1≤j≤M), and a 2-bit image B=b(i, j) is the two dimensional matrix of pixels taking specific values (such as 0 or 0.25 or 0.75 or 1, etc). Here f(i, j) is the gray scale image pixel value and b(i, j) is the 2-bit image pixel value. The 2-bit error diffusion process is designed to preserve the average intensity level between input and output images by propagating the quantization errors to unprocessed neighboring pixels according to some fixed ratios. In the 2-bit error diffusion process, the pixel values b(i, j) of the 2-bit image can be determined, for example, in raster scan order. The value of b(i, j) is determined by using, for example, a set of 3 threshold values (although those ordinarily skilled in the art would understand that any set of threshold values could be used with the systems and methods herein). The following is an example of one possible thresholding operation:

$$b(i, j) = \begin{cases} 0 & \text{if } f(i, j) <= 0.25 \\ 0.25 & \text{if } 0.25 < f(i, j) <= 0.5 \\ 0.75 & \text{if } 0.5 < f(i, j) <= 0.75 \\ 1 & \text{if } f(i, j) > 0.75 \end{cases} \quad (1)$$

The quantizer (Q) error e(i, j) can be computed by $$e(i,j)=f(i,j)-b(i,j) \quad (2)$$

Error diffusion selects the pixel values of the 2-bit image which minimize the absolute value of error |e(i, j)|. Then, the weighted error can be distributed to a set of unprocessed pixels (e.g., k, l, etc.) as shown below (where h represents the error diffusion matrix or kernel).

$$f(i+k,j+l) \leftarrow f(i+k,j+l)+h(k,l)*e(i,j) \quad (3)$$

FIG. 1 illustrates a specialized hardware circuit 100, such as a specialized image processor, used by systems and methods herein. As shown in FIG. 1, a gray scale image data value f(i, j) is converted to a converted image data value b(i, j) and the gray scale image data value f(i, j) are received by an error generation circuit 108 to generate the quantization error e(i, j). The error generation circuit (Q) 104 is an adder that determines the absolute difference between the converted image data value b(i, j) and the gray scale image data value f(i, j). The quantization error e(i, j) is received by a diffusion circuit (H) 106 which diffuses the quantization error e(i, j) to adjacent pixels based upon a set of predetermined weighting coefficients. As illustrated, the initial gray scale image data value f(i, j) is modified based upon adding a quantization error value received from the diffusion circuit (H) 106 to the initial gray scale image data value f(i, j) at adder 102 to generate f(i, j). FIG. 2 illustrates the Floyd-Steinberg error filter H 120, which is one example of the diffusion circuit (H) 106, although those ordinarily skilled in the art would understand that any diffusion circuit could be used by systems and methods herein.

Figure 3:
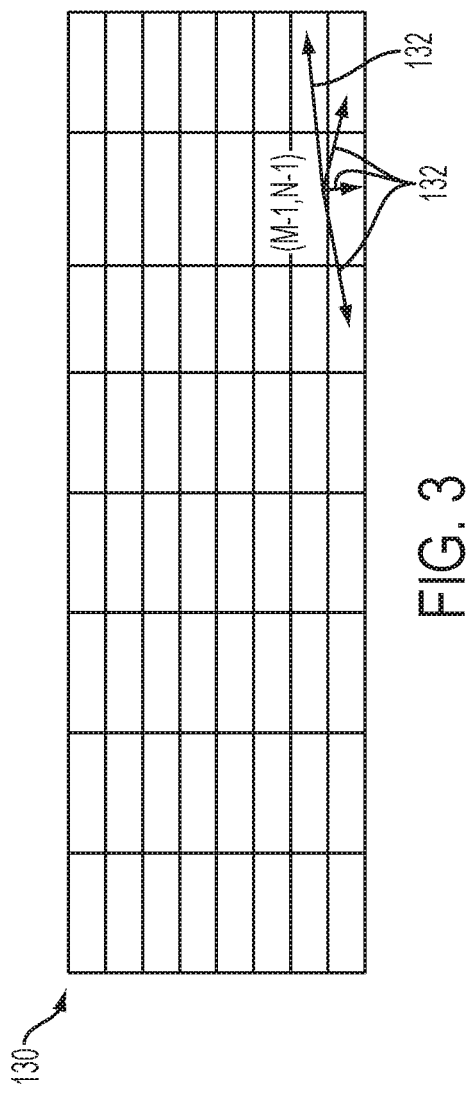
FIG. 3 is a schematic diagram illustrating a matrix herein.
Figure 4:
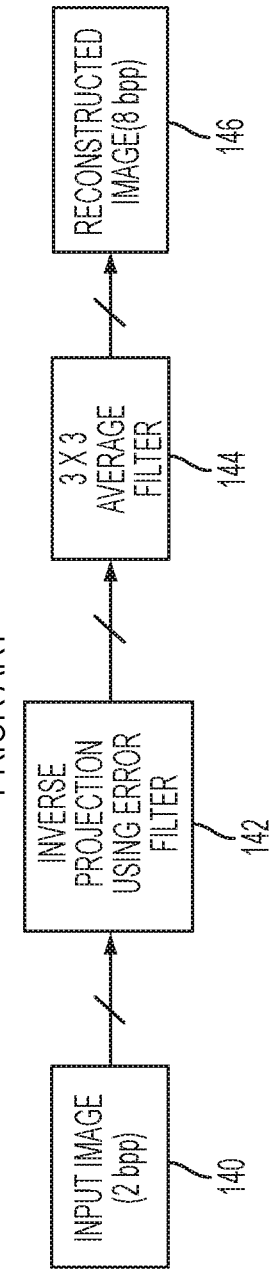
FIG. 4 is a flow diagram of various methods herein.

In this exemplary inverse 2-bit error diffusion, given a error diffused image b(i, j) and an error diffusion kernel h(i, j), it is desired to find a gray scale image f(i, j) such that Peak Signal to Noise Ratio (PSNR) between the input gray image f(i, j) and the reconstructed gray image f(i, j) is increased. The mathematical relationship governing f(i, j), h(i, j) and b(i, j) are given in equations (1)-(3) above, where f(i, j) in (1) is replaced by f(i, j). The method provides reversal of the 2-bit error diffusion mechanism. In this approach, the gray scale image is obtained from the 2-bit error diffused image by reverse propagation of predicted errors weighted using the error diffusion filter kernel. The process is described below using the exemplary Floyd-Steinberg error diffusion kernel shown in FIG. 2. This process is described below, and selected processing is illustrated in FIGS. 3 and 4:

1. Indicate that the input binary image (b), shown as item 140 in FIG. 4 (having, for example, 2 bits per pixel (2 bpp)), will be converted to a reconstructed gray image (f) having, for example, 8 bits per pixel (8 bpp):

Set f=b.

2. Start at the very end of the matrix and work backwards:

Set current pixel (i, j) to the $(M-1, N-1)^{th}$ pixel of M×N image f.

3. Use the error diffusion kernel (filter) to determine the previously introduced error in the input binary image (b) by inverting the 2-bit error diffusion mechanism, as shown by item 142 in FIG. 4:

If b(i, j)=0, set error=−0.125;
else if b(i, j)=0.25, set error=−0.125;
else if b(i, j)=0.75, set error=0.125;
else, set error=0.125.

4. Propagate the predicted error from the current pixel to neighboring pixels by adding the error from step 3 (that is weighted using error filter coefficients, which is shown as an exemplary 3×3 filter 144 in FIG. 4) to neighborhood pixels (as shown graphically as items 132 in the matrix 130 in FIG. 3):

$$f(i+k,j+l) \leftarrow f(i+k,j+l)+h(k,l)*\text{error}.$$

5. Subtract the error value from current pixel:

$$f(i,j)=f(i,j)-\text{error}.$$

Note that with the kernel shown in FIG. 2, the final output value of pixel (i+1, j+1) is determined when the error from the (i, j)$^{th}$ pixel is propagated.

6. Now move to next pixel in reverse order i.e., (i, j−1)$^{th}$ pixel and repeat the process from step 3.

7. As shown in item 146 in FIG. 4, repeat the process until the first pixel is passed to output a reconstructed gray image (f) shown as item 146 in FIG. 4 (having 8 bits per pixel (8 bpp)).

8. The resultant image is low pass filtered to remove high frequency noises found in reconstructed image.

In the low-pass filtering in step 8, many different types of filters can be used to return a binary or 2-bit halftone image to a gray scale, higher-bit (e.g., 8-bit) image. For example, a 3×3 filter matrix can be used to perform light smoothing.

In this processing, the filter matrix is overlaid on a block of N×N (e.g., 3×3) pixels. Each numerical value in the filter matrix is multiplied by a corresponding underlying pixel value. The resulting products are added together and multiplied by the reciprocal of the sum of the filter values. The resulting value is stored as a pixel in an intermediary smoothed image. The pixel in the intermediary smoothed image is at the same location in the smoothed image as the center pixel in the block of N×N pixels that were filtered in the original image. To process other pixels, the filter matrix is moved to an adjacent pixel in the original image. The low-pass filter matrix may be moved horizontally or vertically.

This low-pass filter matrix is similar in concept to the error filter matrix used in step 4, discussed above and shown an item 144 in FIG. 4. Again, in step 4, the predicted error from the currently-processed pixel over which the error filter matrix is currently centered is propagated to neighboring pixels by weighting the error (from step 3) using filter coefficients of the error filter matrix (which can, for example be the Floyd-Steinberg error filter, applied inversely as the matrix is being processed from the end (lower, right-most matrix location) to the beginning (upper, left-most matrix location). Also, while the Floyd-Steinberg error filter (diffusion kernel) is used with examples herein, those ordinarily skilled in the art would understand that any form of error filter could be used with the systems and methods herein, whether currently known or developed in the future.

Peak signal to noise ratio (PSNR) is used as a performance measure for reconstructed images. Given an original image X of size M×N and its reconstructed image $X^{est}$, PSNR is defined as follows and methods and devices herein have significantly increase PSNR:

$$PSNR = 10\log_{10}\frac{255^2}{\left(\frac{1}{NM}\right)\sum_{i=0}^{N-1}\sum_{j=0}^{M-1}(X_{ij} - X_{ij}^{est})^2}$$

It is noted that various low pass filters of different sigma values and different sizes may be used in step 8, and that images may become more blurred with increasing sigma and size. Inverse projection with filtering produces high PSNR images for lesser sigma values and size compared to a process using only a low pass filter. Thus, inverse projection with filtering provides better edge quality images with a higher PSNR without requiring edge detection from a segmentation process.

The devices and methods herein enable usage of edge enhancement methods on reconstructed images that provides reconstructed images with less edge distortion and higher PSNR, and the image reconstructed looks much sharper after edge enhancement. Further, the devices and methods herein do not require edge segmentation information to preserve edges/text for text and photo and text type inputs because the inverse projection with filtering provides very high edge quality. Also, when only photo type input is provided, the devices and methods herein provide better edges (while, to the contrary, low pass filtering alone will distort the edges in the photo).

Further, the devices and methods herein are not limited to particular sets of threshold values for 2-bit error diffusion. For example, the 2-bit error diffusion image could be generated from an original 8-bit image using, for example, 42, 127 and 212 as the thresholds, and the devices and methods herein would work equally as well. Also, the devices and methods herein can be extended to other bit depths such as 8 bits, etc., per pixel.

Figure 5:
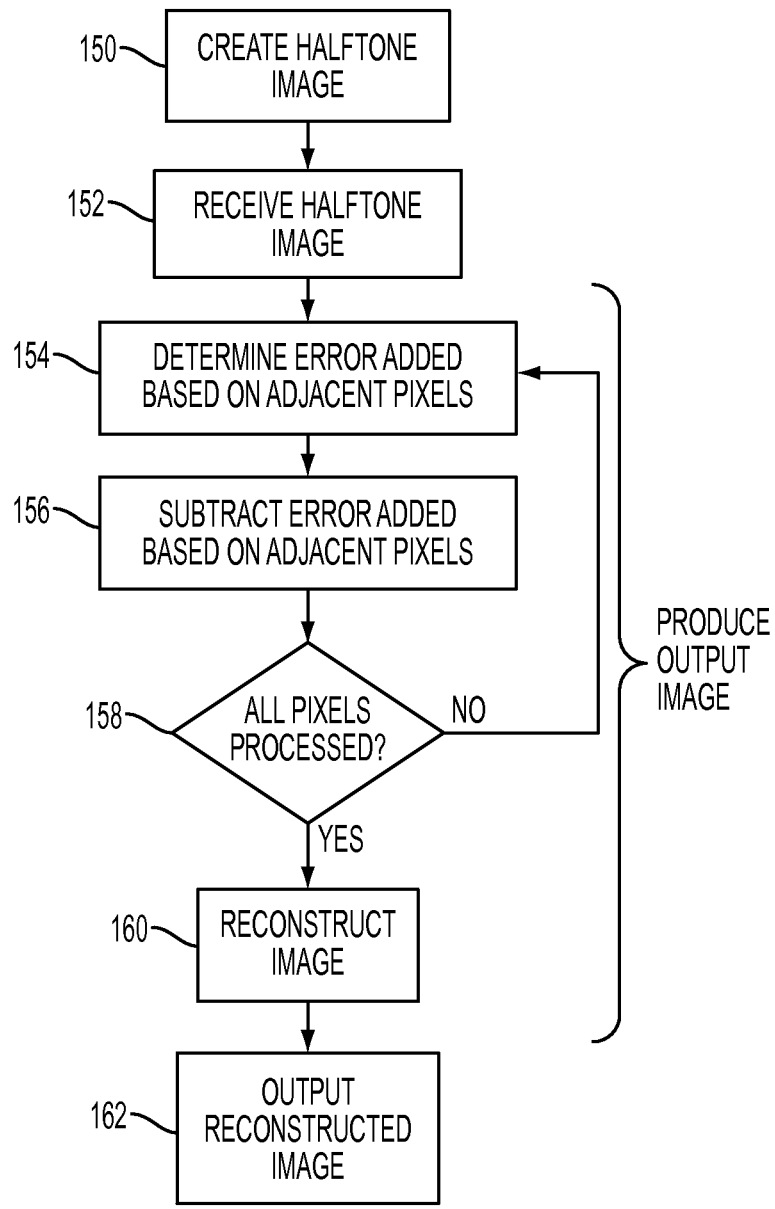
FIG. 5 is a flow diagram of various methods herein.

FIG. 5 is flowchart illustrating exemplary methods herein. In item 150, a reduced bit count per pixel image (e.g., a 1-bit or 2-bit per pixel halftone image) is created by applying a thresholding process and an error weighting matrix to a relatively higher count per pixel image (e.g., an 8-bit per pixel contone image or grayscale image). While the reduced bit count per pixel image (which is referred to using the shorthand term "halftone" image for simplicity) is relatively smaller than the original image, and can be more easily stored and processed by less expensive processors in the image path, the halftone image undesirably includes pixel error that results from the information lost during the conversion to the lower bit count per pixel. Further, the process of converting the original image in item 150 diffuses the pixel error of each pixel to adjacent pixels (using the error weighting matrix) as discussed above.

In item 152, these methods receive the halftone image as an input image. The halftone image is to be reconstructed back into a higher bit count per pixel image that (as accurately as possible) resembles the original image that was used to create the halftone image in item 150.

The methods herein produce an output image (e.g., gray scale or contone image) from the input image, as shown in items 154-160. More specifically, in item 154, this processing uses the error weighting matrix to determine, for each pixel in the input image, the amount of error added based on the adjacent pixels during the converting process. Then, in item 156, this processing removes, for each pixel in the input image, the amount of error that was previously added based on the adjacent pixels in the original conversion.

As shown in item 158 in FIG. 5, the processing in item 154 and 156 is performed for each pixel, and processing loops back until all pixels are processed. For example, the pixels in the input image can be represented in a matrix, and the processes of determining the amount of error 154 and removing the amount of error 156 can be performed by processing each pixel individually (e.g., starting with a last matrix location at the end of the matrix and progressing back, pixel-by-pixel, to a first matrix location at the beginning of the matrix) using the error weighting matrix to determine and remove the error.

After removing the amount of error added based on the adjacent pixels from all pixels in the input image, the original image (or a close approximation thereof) is reconstructed from the input image using a filter, such as a low pass filter in item 160. The reconstruction process produces pixels having a higher bit count per pixel (e.g., 8 bit, etc.) relative to the lower bit count per pixel (e.g., 1 bit, 2 bit, etc.) of the input image. The reconstructed image is then output in item 162.

The process of reconstructing the image in item 160 smoothes each pixel value using a filter, such as a low pass matrix filter. More specifically, the processing in item 160 bases each recreated higher bit count pixel value, at least in part, on the adjacent pixels. In one example, this processing can use the low-pass matrix filter to multiply numerical values of the low-pass matrix filter by corresponding underlying pixel values of pixels adjacent a center pixel (the current pixel being processes over which the low-pass matrix filter is centered) to produce products, add these products together to produce a sum, and then multiply the sum by a reciprocal of the total of the low-pass matrix filter values to produce a resulting value of the center pixel. This is only one example of the user of a low-pass matrix filter, and those ordinarily skilled in the art would understand that other low pass filters could be used to reconstruct the contone image from the halftone image.

Figure 6:
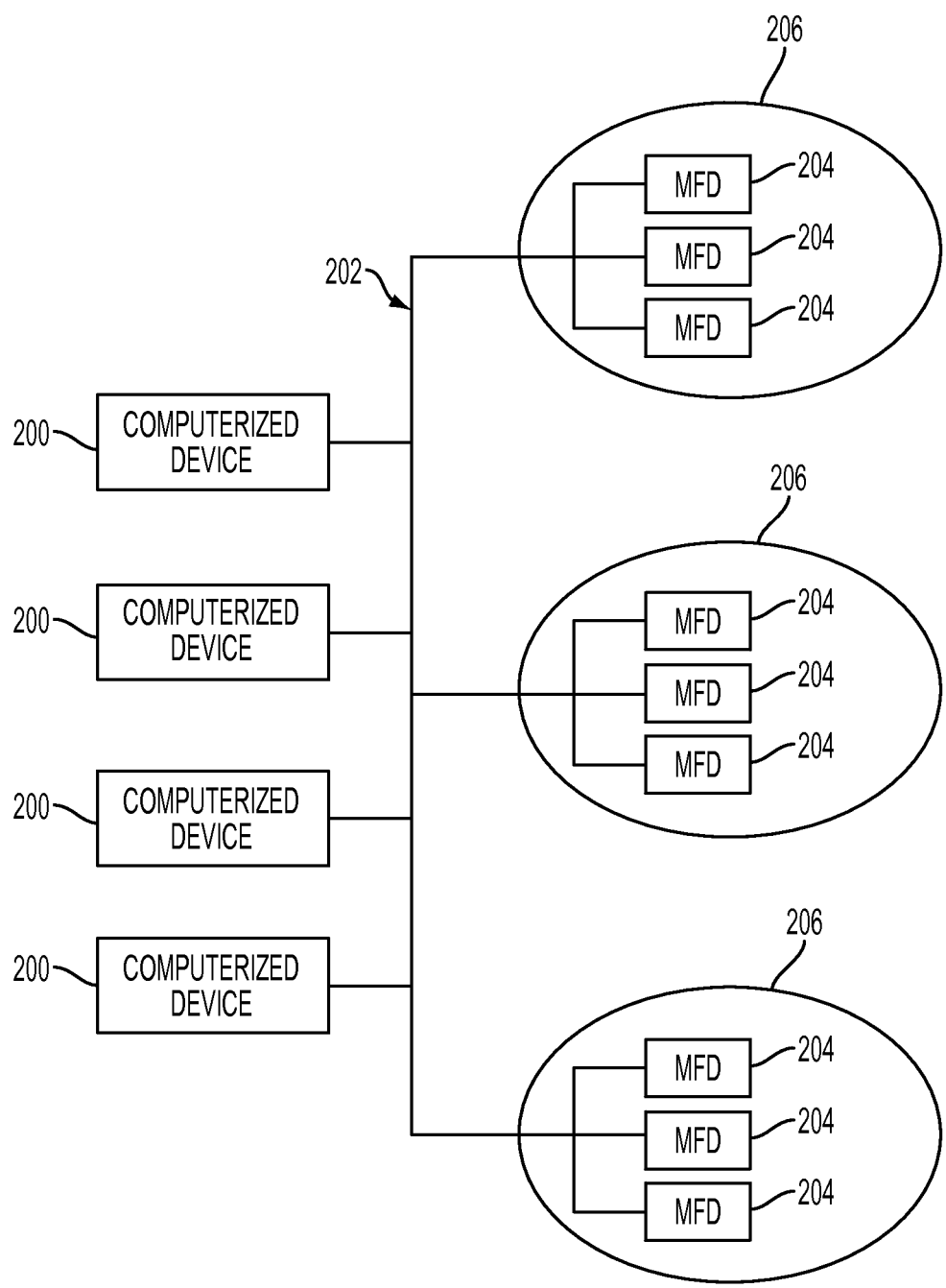
FIG. 6 is a schematic diagram illustrating systems herein.

As shown in FIG. 6, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 7:
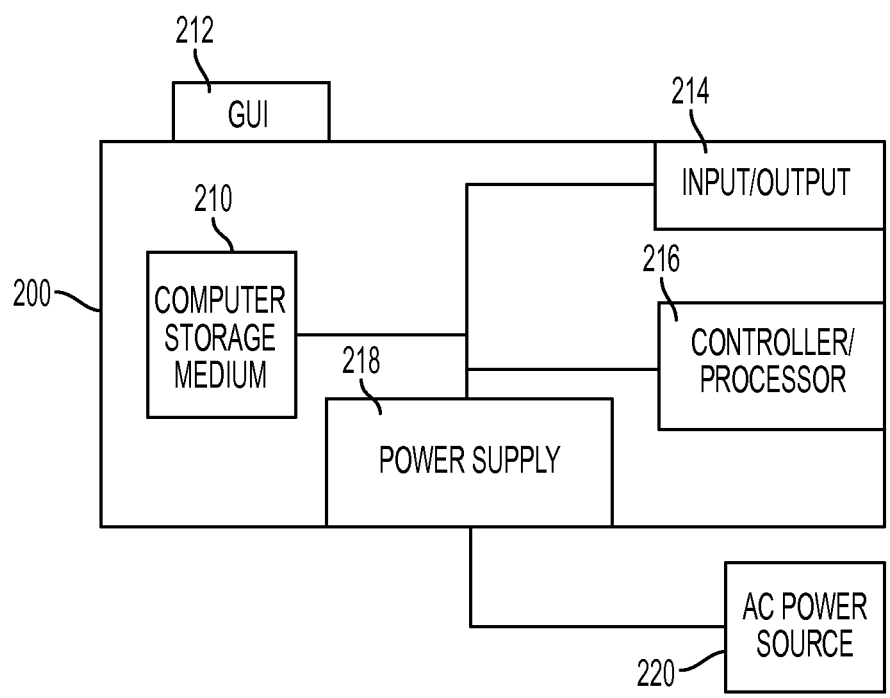
FIG. 7 is a schematic diagram illustrating devices herein.

FIG. 7 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 7, a body housing has one or more functional components that operate on power supplied from an alternating current (AC) source 220 by the power supply 218. The power supply 218 can comprise a common power conversion unit, power storage element (e.g., a battery, etc), etc.

Figure 8:
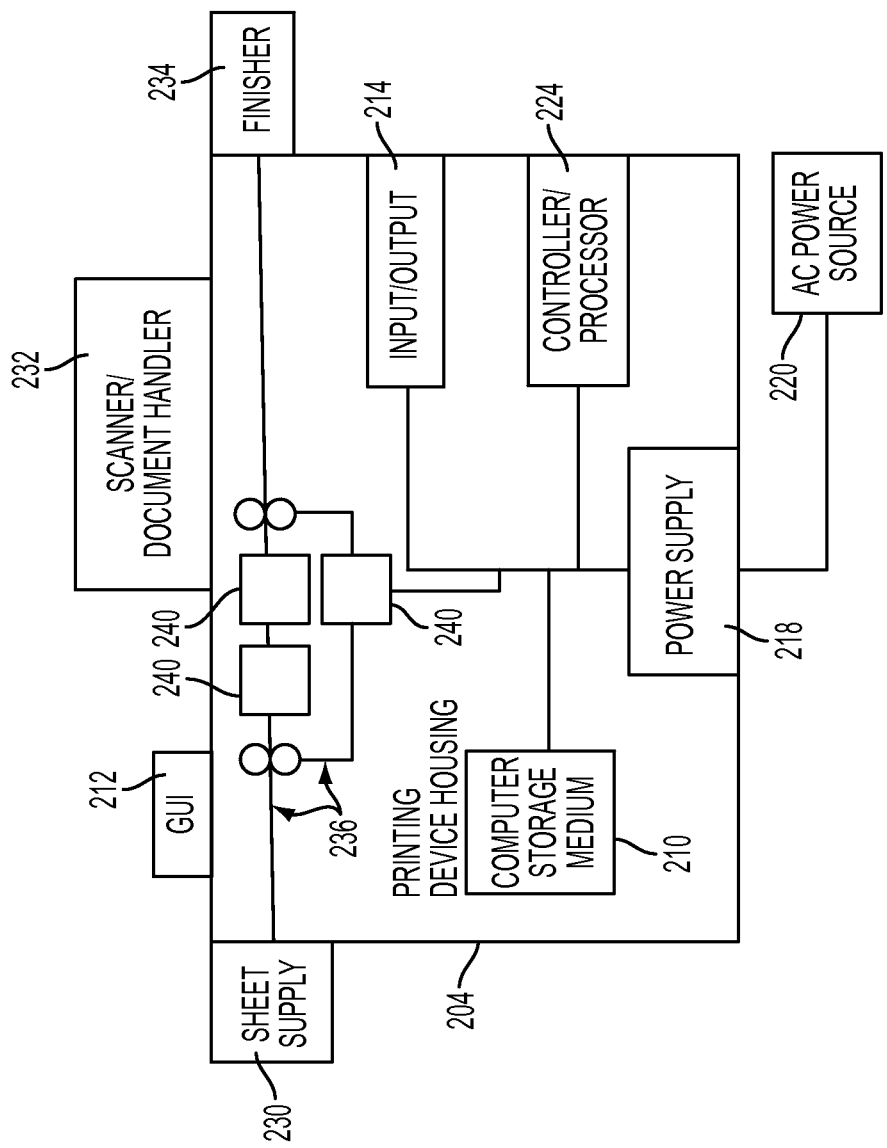
FIG. 8 is a schematic diagram illustrating devices herein.

FIG. 8 illustrates a specialized computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to the tangible processor 216, a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt 248 or an intermediate transfer belt 258, or devices that print directly to print media (e.g., inkjet printers, ribbon-based contact printers, etc.).

Thus, image processing devices herein include, among other elements, an input 214, a specialized image processor 224 (that is different than a general purpose computer because it is specialized for processing image data) operatively connected to the input 214, a filter 142 operatively connected to the image processor 224, and an output 214 operatively connected to the image processor 224. The input 214 receives a halftone image that was previously created by converting an original image into the halftone image to cause the halftone image to have a lower bit count per pixel relative to the original image. Also, the halftone image has pixel error as a result of (based on) the lower bit count per pixel. The process of converting diffuses (or propagates or spreads out) the pixel error of each pixel of the halftone image to adjacent pixels using an error weighting matrix 120.

The image processor 224 produces a gray scale image from the halftone image, and the output 214 outputs the gray scale image. More specifically, the image processor 224 produces the gray scale image from the halftone image by determining (using the error weighting matrix 120) for each pixel in the halftone image, the amount of error added based on the adjacent pixels during the converting. Then, the image processor 224 can remove (from each pixel in the halftone image) the amount of error added based on the adjacent pixels.

After completing the removal of the error added based on the adjacent pixels from all pixels in the halftone image, the image processor 224 reconstructs the halftone image using a filter 142, such as the low pass matrix filter mentioned above. Thus, the image processor 224 performs the reconstructing by basing each pixel value at least in part on the adjacent pixels, and the image processor 224 performs the reconstructing by producing pixels having a higher bit count per pixel relative to the lower bit count per pixel of the halftone image.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A raster image tangible processor (RIP) is a component used in a printing system that produces a raster image also known as a bitmap. The bitmap is then sent to a printing device for output. Raster image processing is the process that turns vector digital information into a high-resolution raster image.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    converting an original image into an input image having a lower bit count per pixel, said input image having pixel error based on said lower bit count per pixel, said converting diffusing said pixel error of each pixel of said input image to adjacent pixels using an error weighting matrix, said input image and consuming less storage and data processing resources relative to said original image;
    receiving said input image represented in an input image matrix into an image path of a printing device; and
    processing said input image through said image path to produce an output image from said input image, said image path having storage and data processing constraints that prevent said image path from processing said original image, said storage and data processing constraints allow said image path to process said input image, and said processing comprising:
        determining, using said error weighting matrix, for each pixel in said input image, an amount of error added based on said adjacent pixels during said converting by processing each pixel individually, starting with a last matrix location at the end of said input image matrix and progressing back, pixel-by-pixel, to a first matrix location at the beginning of said input image matrix;

removing, from each pixel in said input image, said amount of error added based on said adjacent pixels by processing each pixel individually, starting with said last matrix location at the end of said input image matrix and progressing back, pixel-by-pixel, to said first matrix location at the beginning of said input image matrix; and reconstructing said input image using a filter after said removing said amount of error added based on said adjacent pixels from all pixels in said input image to produce said output image, said filter comprising a low-pass matrix filter, said reconstructing:

using said low-pass matrix filter to multiply numerical values of said low-pass matrix filter by corresponding underlying pixel values of pixels adjacent a center pixel over which said low-pass matrix filter is centered to produce products;

adding said products together to produce a sum; and multiplying said sum by a reciprocal of a total of said low-pass matrix filter values to produce a resulting value of said center pixel, and said reconstructing producing pixels having a higher bit count per pixel relative to said lower bit count per pixel of said input image.

2. The method according to claim 1, said lower bit count per pixel comprising 2-bits.

3. A method comprising:

converting an original image into a halftone image having a lower bit count per pixel, said halftone image having pixel error based on said lower bit count per pixel, said converting diffusing said pixel error of each pixel of said halftone image to adjacent pixels using an error weighting matrix, said halftone image and consuming less storage and data processing resources relative to said original image;

receiving said halftone image represented in an halftone image matrix into an image path of a printing device; and processing said halftone image through said image path to produce a grayscale image from said halftone image, said image path having storage and data processing constraints that prevent said image path from processing said original image, said storage and data processing constraints allow said image path to process said halftone image, and said processing comprising:

determining, using said error weighting matrix, for each pixel in said halftone image, an amount of error added based on said adjacent pixels during said converting by processing each pixel individually, starting with a last matrix location at the end of said halftone image matrix and progressing back, pixel-by-pixel, to a first matrix location at the beginning of said halftone image matrix;

removing, from each pixel in said halftone image, said amount of error added based on said adjacent pixels by processing each pixel individually, starting with said last matrix location at the end of said halftone image matrix and progressing back, pixel-by-pixel, to said first matrix location at the beginning of said halftone image matrix; and reconstructing said halftone image using a filter after said removing said amount of error added based on said adjacent pixels from all pixels in said halftone image to produce said grayscale image, said filter comprising a low-pass matrix filter, said reconstructing:

using said low-pass matrix filter to multiply numerical values of said low-pass matrix filter by corresponding underlying pixel values of pixels adjacent a center pixel over which said low-pass matrix filter is centered to produce products;

adding said products together to produce a sum; and multiplying said sum by a reciprocal of a total of said low-pass matrix filter values to produce a resulting value of said center pixel, and said reconstructing producing pixels having a higher bit count per pixel relative to said lower bit count per pixel of said halftone image.

4. The method according to claim 3, said lower bit count per pixel comprising 2-bits.

5. An image processing apparatus comprising:

an image processor converting an original image into an input image having a lower bit count per pixel, said input image having pixel error based on said lower bit count per pixel, said converting diffusing said pixel error of each pixel of said input image to adjacent pixels using an error weighting matrix, said input image and consuming less storage and data processing resources relative to said original image, and said image processor comprises an image path;

an input receiving said input image represented in an input image matrix, said image processor being directly or indirectly connected to said input;

a filter directly or indirectly connected to said image processor; and an output directly or indirectly connected to said image processor, said image processor producing an output image from said input image, said output outputting said output image, said image path having storage and data processing constraints that prevent said image path from processing said original image, said storage and data processing constraints allow said image path to process said input image, said image processor producing said output image from said input image by:

determining, using said error weighting matrix, for each pixel in said input image, an amount of error added based on said adjacent pixels during said converting by processing each pixel individually, starting with a last matrix location at the end of said input image matrix and progressing back, pixel-by-pixel, to a first matrix location at the beginning of said input image matrix;

removing, from each pixel in said input image, said amount of error added based on said adjacent pixels by processing each pixel individually, starting with said last matrix location at the end of said input image matrix and progressing back, pixel-by-pixel, to said first matrix location at the beginning of said input image matrix; and reconstructing said input image using said filter after completing said removing said amount of error added based on said adjacent pixels from all pixels in said input image to produce said output image, said filter comprising a low-pass matrix filter said image processor performing said reconstructing by:

using said low-pass matrix filter to multiply numerical values of said low-pass matrix filter by corresponding underlying pixel values of pixels adjacent a center pixel over which said low-pass matrix filter is centered to produce products;

adding said products together to produce a sum; and multiplying said sum by a reciprocal of a total of said low-pass matrix filter values to produce a resulting value of said center pixel, and said image processor performing said reconstructing by producing pixels having a higher bit count per pixel relative to said lower bit count per pixel of said input image.

6. The image processing apparatus according to claim 5, said lower bit count per pixel comprising 2-bits.

7. An image processing apparatus comprising:

an image processor converting an original image into an halftone image having a lower bit count per pixel, said halftone image having pixel error based on said lower bit count per pixel, said converting diffusing said pixel error of each pixel of said halftone image to adjacent pixels using an error weighting matrix, said halftone image and consuming less storage and data processing resources relative to said original image, and said image processor comprises an image path;

an input receiving said halftone image represented in an halftone image matrix, said image processor directly or indirectly connected to said input;

a filter directly or indirectly connected to said image processor; and an output directly or indirectly connected to said image processor, said image processor producing a gray scale image from said halftone image, said output outputting said gray scale image, said image path having storage and data processing constraints that prevent said image path from processing said original image, said storage and data processing constraints allow said image path to process said halftone image, said image processor producing said gray scale image from said halftone image by:

determining, using said error weighting matrix, for each pixel in said halftone image, an amount of error added based on said adjacent pixels during said converting by processing each pixel individually, starting with a last matrix location at the end of said halftone image matrix and progressing back, pixel-by-pixel, to a first matrix location at the beginning of said halftone image matrix;

removing, from each pixel in said halftone image, said amount of error added based on said adjacent pixels by processing each pixel individually, starting with said last matrix location at the end of said halftone image matrix and progressing back, pixel-by-pixel, to said first matrix location at the beginning of said halftone image matrix; and reconstructing said halftone image using said filter after completing said removing said amount of error added based on said adjacent pixels from all pixels in said halftone image to produce said grayscale image, said filter comprising a low-pass matrix filter, said image processor performing said reconstructing by:

using said low-pass matrix filter to multiply numerical values of said low-pass matrix filter by corresponding underlying pixel values of pixels adjacent a center pixel over which said low-pass matrix filter is centered to produce products;

adding said products together to produce a sum; and multiplying said sum by a reciprocal of a total of said low-pass matrix filter values to produce a resulting value of said center pixel, and said image processor performing said reconstructing by producing pixels having a higher bit count per pixel relative to said lower bit count per pixel of said halftone image.

8. The image processing apparatus according to claim 7, said lower bit count per pixel comprising 2-bits.

\* \* \* \* \*